United States Patent [19]

Borman et al.

[11] 4,169,081

[45] Sep. 25, 1979

[54] PROCESS FOR THE PREPARATION OF POLYESTERS HAVING STABILIZED MELT VISCOSITY IN THE PRESENCE OF AROMATIC (POLY-)CARBONATES

[75] Inventors: Willem F. H. Borman, Evansville; Frank N. Liberti, Mount Vernon, both of Ind.

[73] Assignee: General Electric Company, Pittsfield, Mass.

[21] Appl. No.: 901,773

[22] Filed: May 1, 1978

Related U.S. Application Data

[62] Division of Ser. No. 751,365, Dec. 16, 1976, Pat. No. 4,126,592.

[51] Int. Cl.² .................. C08G 63/46; C08G 63/48
[52] U.S. Cl. .................. 260/22 A; 260/22 R; 260/22 M; 260/26; 260/660; 260/DIG. 24; 525/439
[58] Field of Search .............. 260/22 A, 22 R, 26, 260/860, 22 M, DIG. 24

[56] References Cited

U.S. PATENT DOCUMENTS

| | | | |
|---|---|---|---|
| 2,465,319 | 3/1949 | Whinfield et al. | 260/75 R |
| 2,476,714 | 7/1949 | Ender | 260/26 |
| 2,724,705 | 11/1955 | Glover | 260/26 |
| 3,047,539 | 7/1962 | Pengilly | 260/75 R |
| 3,386,935 | 6/1968 | Jackson et al. | 260/26 |
| 3,423,342 | 1/1969 | Kendall | 260/26 |
| 3,516,957 | 6/1970 | Gray et al. | 260/31.8 XA |
| 3,671,487 | 6/1972 | Abolins | 260/DIG. 24 |
| 3,673,139 | 6/1972 | Hrach | 260/22 R |
| 3,833,535 | 9/1974 | Wambach | 260/40 R |
| 3,833,685 | 9/1974 | Wambach | 260/860 |
| 3,855,277 | 12/1974 | Fox | 260/860 |
| 3,904,561 | 9/1975 | Borman et al. | 260/22 R |
| 3,915,926 | 10/1975 | Wambach | 260/860 |
| 3,936,400 | 2/1976 | Wambach | 260/860 |
| 3,953,394 | 4/1976 | Fox et al. | 260/860 |

*Primary Examiner*—Ronald W. Griffin
*Attorney, Agent, or Firm*—Morgan, Finnegan, Pine, Foley & Lee

[57] ABSTRACT

The melt viscosity of high molecular weight linear polyesters is stabilized in the presence of aromatic (poly-)carbonates by adding a minor proportion of a non-volatile monofunctional ester-forming compound to a mixture of glycol and terephthalate or isophthalate reactants and heating the resulting mixture. The products of the process are suitable for conversion to compositions with aromatic (poly-)carbonates, especially flame retarded such compositions, where stabilized melt viscosity during fabrication is critical.

11 Claims, No Drawings

PROCESS FOR THE PREPARATION OF POLYESTERS HAVING STABILIZED MELT VISCOSITY IN THE PRESENCE OF AROMATIC (POLY-)CARBONATES

CROSS-REFERENCE TO RELATED APPLICATION

This is a division of application Ser. No. 751,365, filed Dec. 16, 1976, now U.S. Pat. No. 4,126,592.

This invention relates to the production of thermoplastic polyester compositions. More particularly, it pertains to stabilizing the melt viscosity of linear high molecular weight polyesters by adding a monofunctional ester-forming compound to the difunctional esterification reactants and heating the mixture prior to compounding with aromatic (poly-)carbonates. The products of the process are superior for processing where melt stability is critical, especially when modified with flame retardant additives comprising aromatic (poly-)carbonates and/or synergists, e.g., antimony compounds.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539. These patents disclose that the polyesters are particularly advantageous as film and fiber-formers.

For certain applications, such as injection or extrusion, and blow molding or blown film extrusions, it is desirable to use polyester resins of high and stable melt viscosity. Linear polyesters, however, are known to interact with aromatic carbonates and (poly-)carbonates during compounding to give very high molecular weight/melt viscosity products.

Such carbonate species may include, e.g., decabromodiphenyl carbonate, copolycarbonates of bisphenol-A and tetrabromobisphenol-A, bisphenol-A polycarbonate, tetrabromobisphenol polycarbonte, and the like. Increase in melt viscosity is particularly undesirable when the polyester is compounded with bisphenol-A (BPA)-tetrabromo BPA copolycarbonate (flame retardant), and $Sb_2O_3$ (synergistic flame retardant additive) that, unavoidably, also acts as catalyst in the linear polyesterpolycarbonate reaction. See, U.S. Pat. Nos. 3,936,400; 3,833,685; 3,833,535; 3,855,277; and 3,915,926. The interaction causing increases in melt viscosity proceeds via terminal OH groups on the polyester, e.g., poly(1,4-butylene terephthalate), molecules. It has now been discovered that by blocking these with monofunctional reagents of low volatility, so that they survive the polyester manufacturing process, the interaction with aromatic carbonate is blocked and melt viscosity of the blends can be kept under control.

DESCRIPTION OF THE INVENTION

According to this invention, there is provided a process for producing a high molecular weight linear polyester resin which is melt viscosity stabilized in the presence of an aromatic carbonate or (poly-)carbonate, said polyester resin being selected from the group consisting of polymeric glycol terephthalate and isophthalate esters having repeating units of the general formula:

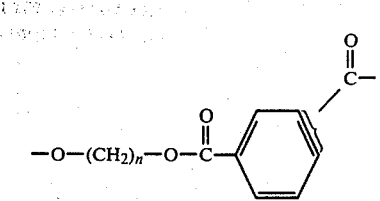

wherein n is a whole number of from 2 to 10, and mixtures of such esters, said process comprising adding a small amount of a relatively non-volatile monofunctional ester-forming compound to an esterification mixture comprising the corresponding glycol and terephthalic or isophthalic acid or a reactive derivative thereof and heating the mixture under polyesterification conditions until formation of said melt viscosity stabilized polyester is substantially complete.

When used herein, the expression "stabilized melt viscosity" refers to the flowability of the molten resin in intimate admixture with an aromatic carbonate or (poly-)carbonate relative to the resin alone. It is a property which can be measured by means well known to those skilled in the art. One convenient method is the use of a capillary melt viscometer known as "Melt Strength Tester" of the type manufactured by Toyo Seiki, Tokyo, Japan. The method will be described hereinafter.

The higher molecular weight linear polyesters formed in the present process are polymeric glycol esters of terephthalic acid and isophthalic acids. They can be prepared by known techniques such as by the alcoholysis of esters of the phthalic acid with a glycol and subsequent polymerization, by heating glycols with the free acids or with halide derivatives thereof, and similar processes. These are described in U.S. Pat. Nos. 2,465,319 and 3,047,539, and elsewhere. In addition to the phthalates, amounts, e.g., from 0.5 to 15% by weight, of other aromatic dicarboxylic acids, such as naphthalene dicarboxylic acid, can be present in the polyester component. Although the term "linear" is used, the reactants can also include amounts of tri- or polyfunctional branching agents, such as trimethylolpropane, pentaerythritol, trimethyl trimesate. In any event, however, all such processes are modified according to this invention by including in the polyesterification mixtures, small amounts of relatively non-volatile monofunctional ester-forming organic compounds.

Preferred polyesters will be of the family consisting of high molecular weight, polymeric glycol terephthalates or isophthalates having repeating units of the general formula:

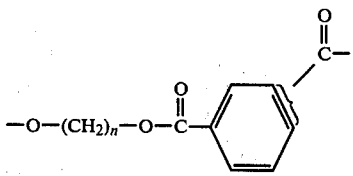

wherein n is a whole number of from 2 to 10, preferably from 2 to 4, and mixtures of such esters, including copolyesters of terephthalic and isophthalic acids of up to about 30 mole % isophthalic units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, after completion of the reaction, the high molecular weight polyesters will have an intrinsic viscosity of about 0.6 to 2.0 dl./g. and preferably, from 0.7 to 1.6 dl./g., as measured, for example, in a 60:40 phenol-tetrachloroethane mixture at 30° C.

Non-volatile monofunctional ester-forming organic compounds selected for use can vary within fairly wide limits. Preferably, the compounds will contain only carbon, hydrogen and oxygen. The compounds preferably will have a molecular weight of below about 3500, to facilitate blending with the glycols and terephthalate and/or isophthalate and or reactive derivatives thereof, used in forming the polyester resin units. The monofunctional group is a carboxyl group, a carboalkoxyl group or an alcohol group. Especially useful compounds include oleic acid, methyl oleate, stearic acid, methyl stearate, palmitic acid, methyl palmitate, octadecyl alcohol, hexadecyl alcohol, and the like. Other especially useful such compounds are a methyl ester of hydrogenated wood rosin, available from Hercules, Inc., Wilmington, Delaware, under the tradename "Hercolyn D"; abietol, a partially hydrogenated alcohol obtained by reduction of wood rosin, also available from Hercules; and a fully hydrogenated wood rosin, available from Hercules under the tradename "Foral AX".

The monofunctional ester-forming compounds are readily available or can be made in ways known to those skilled in the art.

The monofunctional ester-forming organic compound may be employed with the ester resin forming ingredients in any effective amount, but preferably, small amounts are used, e.g., at a range of 0.1 to 15% by weight. However, a particularly preferred range is 0.5 to 12% by weight. Within this particularly preferred range, it has been found advantageous to employ in certain compositions about 0.5 to 10% by weight. All percentages are based on the combined weights of glycol, terephthalate, reactive derivative thereof, etc.

The process of this invention can be carried out in standard procedures for making high molecular weight polyesters. In one convenient way, a reactor is charged with the terephthalic acid and/or isophthalic acid or an alkyl ester thereof and the glycol, preferably a small excess, an optional catalyst, e.g., a tetraalkyl titanate, especially if ester reactants are used, and the monofunctional ester-forming compound are added. The mixture is then heated, e.g., to between 150° and 220° C. under a moderate vacuum, e.g., 0.2 to 5 inches of mercury, until water and/or methanol and excess glycol ceases to be evolved and production of a polyester-prepolymer is substantially complete. The mixture is then transferred to a suitable reactor and heated, e.g., to between 190° and 275° C. under a very high vacuum, e.g., about 0.2 mm of mercury, until the desired degree of polymerization is achieved. Alternatively, the prepolymer can be made without the addition of the monofunctional ester-forming compound, then the prepolymer can be intimately blended with the monofunctional ester-forming compound, and the intimate blend can be heated to high temperature under a high vacuum until a resin of the desired degree of polymerization is obtained. In any case, the molecular weight can be elevated still more by the known technique of "solid state polymerization" which comprises heating subdivided solid resin at a temperature above its softening point, but below its sticking point until the desired degree of increase is achieved. Illustrative temperatures are generally in the range of 150° to 215° C.

In a preferred feature of this invention, a flame retardant additive comprising an aromatic (poly-) or (copoly-)carbonate will be added to the melt viscosity stabilized polyesters prepared according to this invention, and the resulting compositions will have substantially improved processability.

Illustrative flame retardant additives of this type are disclosed in U.S. Pat. No. 3,915,926 and 3,671,487 which are hereby incorporated by reference. They can be used alone or admixed with synergists, such as antimony compounds, e.g., antimony oxide.

The amount of aromatic (homopoly-) or (copoly-)carbonate flame retardant additive used is not critical to the invention, so long as it is present in a minor proportion based on said composition—major proportions will detract from physical properties—but at least sufficient to render the block polyester resin non-burning or self-extinguishing. Those skilled in the art are well aware that the amount will vary with the nature of the resin and with the efficiency of the additive. In general, however, the amount of additive will be from 0.5 to 50 parts by weight per 100 parts of resin. A preferred range will be from abut 3 to 40 parts and an especially preferred range will be from about 8 to 40 parts of additive per 100 parts of resin. Synergists, e.g., antimony oxide, will be used at about 2 to 10 parts by weight per 100 parts of resin.

Among the typical flame retardant additives are those consisting of aromatic (homopoly-)carbonates having repeating units of the formula:

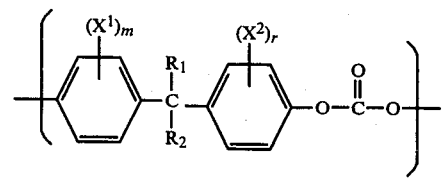

wherein $R^1$ and $R^2$ are hydrogen, (lower)alkyl or phenyl, $X^1$ and $X^2$ are bromo or chloro and m and r are from 1 to 4. These materials may be prepared by techniques well known to those skilled in the art. Preferred are aromatic (copoly-)carbonates in which from 25 to 75 weight percent of the repeating units comprise chloro- or bromo-substituted dihydric phenol, and the balance are unsubstituted dihydric phenol, e.g., bisphenol-A units. See, e.g., A. D. Wambach, U.S. Pat. No. 3,915,926, above-mentioned.

The additives can be intimately blended in a number of procedures. In one way, the flame retardant additive is put into an extrusion compounder with the dry polyester resin and the blend is heated at an elevated temperature, e.g., 450°-550° F., and extruded to produce molding pellets. The additive compound or compounds are dispersed in the molten polyester resin by the process. In another procedure, the flame retardant compound(s) is mixed with the polyester resin by blending at ordinary temperatures, then the blend is fluxed on a mill, heated, e.g., at 450°-550° F., then cooled and comminuted; or the blend can be extruded at 450°-550° F., cooled and chopped. The flame retardant compound(s)

can also be mixed with the powdered or granular polyester and the mixture can be heated and directly formed into blow molded items using machines which compound and mold.

It is always very important to thoroughly free all of the ingredients: resin and additives from as much water as possible before blending them.

In addition, compounding should be carried out to ensure that the residence time in the machine is short; the temperature is carefully controlled, the friction heat is utilized; and an intimate blend between the resin and the additive is obtained.

It should be understood that the polyesters reacted with the monofunctional compounds by this invention are useful as melt viscosity stabilized components in the presence of aromatic (poly-)carbonates in further combination with other conventional additive agents such as, for example, antioxidants, carbon black, reinforcing agent, plasticizers, lubricity promoters, color stabilizers, ultraviolet absorbers, X-ray opacifiers, dyes, pigments, fillers, and the like.

DESCRIPTION OF THE PREFERRED EMBODIMENTS

The following examples illustrate the invention. They are set forth as a further description but are not to be construed as limiting the invention thereto.

The melt viscosity of the compounded polyesters are measured in a capillary melt viscometer ("Melt Tension Tester Model II") built by Toyo Seiki Seisaku Sho, Tokyo, Japan. The instrument consists of a heating cylinder and orifice of the same dimensions as the "melt indexer" described in ASTM-D 1238. After preheating the polymer example, it is forced through the capillary orifice by means of a piston, driven by mechanical means at a constant rate chosen to provide a shear rate at the wall of the capillary of 10 sec.$^{-1}$. The melt temperature during the determination is maintained at 250° C. The force applied to the piston is measured with a load cell and recorded continuously on a strip chart. The melt viscosity is calculated from the force on the piston and the shear rate at the wall of the capillary. In general, the melt viscosity is observed to change with time; the rate of change over a time period $t_1$ to $t_2$ minutes from the start of the measurement is calculated from the formula:

$$\% \text{ Rate of change} = \frac{M_2 - M_1}{M_1 (t_2 - t_1)} \times 100$$

in which $M_1$ and $M_2$ are the melt viscosities determined after $t_1$ and $t_2$ minutes heating time.

EXAMPLE 1

Dimethyl terephthalate, 30 lbs., 1,4-butanediol, 25 lbs., and 11 g. of tetra(2-ethylhexyl)titanate, are mixed with 100 g. of stearic acid and heated in stages to 202° C. and the vacuum is increased to 0.3 in. Hg. The prepolymer is transferred to a high vacuum reactor and polymerization is carried out at about 250° C. and at a pressure of about 0.2 mm of Hg. After two hours, the vacuum is released and the polyester resin product has a melt viscosity of 7,500 poises at 250° C.

The polyester, 1,033 g., is compounded with a flame retardant agent comprising a 1:1 copolycarbonate of bisphenol-A and tetrabromo bisphenol-A (prepared according to the general procedure of U.S. Pat. No. 3,833,685), 75 g. of antimony oxide and 2.25 g. of antioxidant (Irganox 1093), using a 1½" extruder, to produce a flame retardant composition. The extrudate is pelletized and dried then placed in a capillary melt viscometer and the melt viscosity determined over a period of from 5–10 minutes after loading the sample in the viscometer at 250° C., $\gamma = 10$ sec.$^{-1}$. The composition according to this invention has a viscosity of 14,850 poises after 5 minutes, which gradually decreases to 10,800 poises after 15 minutes, corresponding to a rate of decrease of 2.7% per minute.

EXAMPLE 2

The procedure of Example 1 is repeated substituting 200 g. of stearic acid for the 100 g. used as the nonvolatile monofunctional ester-forming compound according to this invention. After polyester formation is substantially complete, the polyester has a melt viscosity of 1,830 poises. This indicates that a higher level of stearic acid produces a lower molecular weight, as would be expected from a molecular weight control additive.

After compounding 1,033 g. of the polyester resin product according to this example, with the flame retardant additives and antioxidants, the final product has a melt viscosity of 4,220 poises after 5 minutes, increasing to 4,530 poises after 15 minutes (the sample is measured with a small orifice at $\gamma = 376$ sec.$^{-1}$), at a rate of increase of 0.7% per minute.

EXAMPLE 3

Poly(1,4-butylene terephthalate) is prepared by the method of Example 1 except that 1.1 weight percent oleic acid based on dimethyl terephthalate is added to the charge. This resin (PBT) is compounded into a flame retardant composition as follows:

| Composition | Parts by Weight |
|---|---|
| PBT resin | 66.8 |
| Brominated (poly-)carbonate | 26.0 |
| Antimony oxide | 5.0 |
| Irganox 1093, stabilizer | 0.15 |
| Ferro 904, stabilizer | 0.05 |
| Bisphenol-A (poly-)carbonate | 2.0 |

The melt viscosity of the composition from oleic acid-modified resin is 8900 poise after 5 minutes and 6680 poise after 15 minutes, a decrease of 2.5%/minute, indicating that no interaction takes place between PBT and poly-carbonate. In contrast, the melt viscosity of a PBT which has not been modified with oleic acid is 9290 poise after 5 minutes preheating and 12,120 poise at 15 minutes, an increase of 3.0% per minute.

EXAMPLE 4

The procedure of Example 3 is repeated, except that only 0.73 weight percent oleic acid based on DMT is employed. Further, the product is brought to its final melt viscosity by solid state polymerization. A control sample of PBT, not containing oleic acid, is also brought to its final melt viscosity by solid state polymerization. Both samples are compounded into the flame retardant composition as in Example 3. The melt viscosity of the composition from oleic acid-modified PBT resin is 7110 after 5 minutes and 5300 after 13 minutes, a decrease of 2.6%/minute. The melt viscosity of the control is 8670 poise at 5 minutes and 8980 poise after 13 minutes, an increase of 0.4%/minute.

EXAMPLE 5

Resin samples from Example 4, prior to solid state polymerization, are compounded into a glass fiber reinforced flame retardant composition as follows:

| Composition | Parts by Weight |
|---|---|
| PBT resin | 62.3 |
| Brominated polycarbonate | 16.5 |
| Antimony oxide | 6.0 |
| Irganox 1093 | 0.15 |
| Ferro 904 | 0.05 |
| Glass fibers | 15.0 |

The melt viscosity of the resin from oleic acid-modified PBT is 4000. The melt viscosity of the control resin is 5000 poise.

EXAMPLE 6

The procedure of Example 3 is repeated on a larger scale. The oleic acid-modified resin provides a composition with 8140 poise melt viscosity. The melt viscosity of the control resin is 12340 poise.

EXAMPLE 7

Poly(1,4-butylene terephthalate) is prepared as in Example 1, but substituting 175 g. of a methyl ester of hydrogenated wood rosin ("Hercolyn D", Hercules, Inc.) for stearic acid. The product is compounded into a flame retardant composition as in Example 3. The melt viscosity of the composition, after 5 minutes preheating to 250° C., is 10,620 poise and decreases at a rate of 2.5% per minute.

EXAMPLE 8

The procedure of Example 7 is repeated, except that the modifying additive consists of 132 g. abietol, the partially hydrogenated alcohol obtained by reduction of wood rosin (Hercules, Inc.). When compounded into a flame retardant composition as before, the product has a melt viscosity of 10,200 poise, decreasing at a rate of 2.3% per minute.

EXAMPLE 9

The procedure of Example 7 is repeated, using 180 g. of fully hydrogenated wood rosin ("Foral AX", Hercules, Inc.). The resulting flame retardant composition has a melt viscosity at 250° C. of 7200 poise, decreasing at a rate of 1.0%/minute.

Other modifications are possible. For instance, if the procedure of Example 1 is repeated, substituting for the 1,4-butanediol and dimethyl terephthalate the following materials, respectively:

ethylene glycol and dimethyl terephthalate;
ethylene glycol and (i) dimethyl terephthalate and (ii) dimethyl isophthalate at a molar ratio of 70/30 (i):(ii); or
trimethylene glycol and methyl terephthalate, polyester compositions with stabilized melt viscosity will be obtained.

Obviously, other modifications and variations of the present invention are possible in the light of the above teachings. For example, instead of stearic acid, methyl stearate can be used. It is, therefore, to be understood that changes may be made in the particular embodiments of the invention described which are within the full intended scope of the invention as defined by the appended claims.

We claim:

1. A flame retardant polyester composition with stable melt viscosity comprising (1) a high molecular weight linear thermoplastic polyester resin selected from the group consisting of polymeric glycol terephthalate and isophthalate esters having repeating units of the general formula:

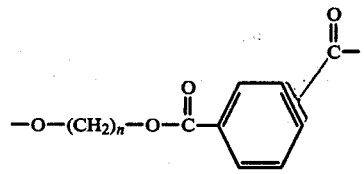

wherein n is a whole number of from 2 to 10, and mixtures of such esters, and (2) a flame retardant additive comprising an aromatic (poly-)carbonate, said composition produced by the process comprising (i) adding a small effective amount of a relatively non-volatile monofunctional ester-forming compound to an esterification mixture comprising the corresponding glycol and terephthalic or isophthalic acid or a reactive derivative thereof and heating the mixture under polyesterification conditions until formation of said melt viscosity stabilized polyester is substantially complete, and (ii) intimately blending the melt viscosity stabilized polyester resin with said flame retardant additive.

2. A composition as defined in claim 1 wherein said polyester is poly(1,4-butylene terephthalate).

3. A composition as defined in claim 1 wherein said non-volatile monofunctional ester-forming organic compound contains only carbon, hydrogen and oxygen.

4. A composition as defined in claim 3 wherein the monofunctional ester-forming groups in said organic compound is a carboxyl group, a carboalkoxyl group or a hydroxyl group.

5. A composition as defined in claim 4 wherein said organic compound is stearic acid.

6. A composition as defined in claim 4 wherein said organic compound is oleic acid.

7. A composition as defined in claim 4 wherein said organic compound is a methyl ester of hydrogenated wood rosin.

8. A composition as defined in claim 4 wherein said organic compound is a partially hydrogenated alcohol prepared by reduction of wood rosin.

9. A composition as defined in claim 4 wherein said organic compound is a fully hydrogenated wood rosin.

10. A composition as defined in claim 1 wherein said monofunctional ester-forming organic compound is present in an amount of from about 0.1 to about 15% by weight based on the total weight of said mixture.

11. A composition as defined in claim 10 wherein said monofunctional ester-forming organic compound is present in an amount of from about 0.5 to about 12% by weight based on the total weight of said mixture.

* * * * *